United States Patent [19]

Miyazawa et al.

[11] Patent Number: 5,238,603
[45] Date of Patent: Aug. 24, 1993

[54] OPTICALLY ACTIVE LIQUID CRYSTALLINE COMPOUND AND A COMPOSITION CONTAINING SAME

[75] Inventors: Kazutoshi Miyazawa; Naoyuki Yoshida; Masakazu Kaneoya, all of Ichiharashi, Japan

[73] Assignee: Chisso Corporation, Osaka, Japan

[21] Appl. No.: 864,678

[22] Filed: Apr. 7, 1992

Related U.S. Application Data

[63] Continuation of Ser. No. 468,009, Jan. 22, 1990, abandoned, which is a continuation of Ser. No. 240,192, Sep. 6, 1988, abandoned.

[30] Foreign Application Priority Data

Oct. 15, 1987 [JP] Japan .................. 62-260209

[51] Int. Cl.$^5$ .............. C09K 19/12; C09K 19/20; C07C 255/00; C07C 41/00
[52] U.S. Cl. ........................ 252/299.65; 252/299.66; 252/299.67; 558/411; 558/416; 560/59; 560/64; 560/65; 560/73; 560/111; 568/631; 568/642; 568/643; 568/644; 568/645; 568/647
[58] Field of Search ............ 252/299.01, 299.66, 252/299.65, 299.67; 560/59, 64, 73, 65, 111; 568/631, 642, 643, 644, 645, 647; 558/411, 416

[56] References Cited

U.S. PATENT DOCUMENTS

| | | | |
|---|---|---|---|
| 4,576,732 | 3/1986 | Isogai et al. | 252/299.65 |
| 4,596,667 | 6/1986 | Inukai et al. | 252/299.68 |
| 4,676,925 | 6/1987 | Inoue et al. | 252/299.65 |
| 4,689,176 | 8/1987 | Inoue et al. | 252/299.65 |
| 4,728,458 | 3/1988 | Higuchi et al. | 252/299.65 |
| 4,751,019 | 6/1988 | Saito et al. | 252/299.66 |
| 4,753,752 | 6/1988 | Raynes | 252/299.65 |
| 4,754,792 | 11/1988 | Inoue et al. | 252/299.61 |
| 4,780,240 | 10/1988 | Emoto et al. | 252/299.65 |
| 4,780,241 | 10/1988 | Furukawa | 252/299.63 |
| 4,801,756 | 1/1989 | Kano et al. | 252/299.66 |
| 4,816,181 | 3/1989 | Miyazawa | 252/299.65 |
| 4,818,432 | 4/1989 | Miyazawa | 252/799.86 |
| 4,834,907 | 5/1989 | Inoue et al. | 252/299.66 |
| 4,886,622 | 12/1989 | Miyazawa | 252/299.65 |
| 4,914,224 | 3/1990 | Shoji | 560/65 |
| 4,946,989 | 8/1990 | Kawamura | 560/51 |
| 4,970,023 | 11/1990 | Hirai et al. | 252/299.66 |

FOREIGN PATENT DOCUMENTS 341922 11/1989 European Pat. Off. .

*Primary Examiner*—Philip C. Tucker
*Attorney, Agent, or Firm*—Lowe, Price, LeBlanc & Becker

[57] ABSTRACT

A liquid crystal compound having specific features suitable to use for a display mode utilizing ferroelectric liquid crystals, particularly a large spontaneous polarization value and a liquid crystal composition using the compound are provided, which compound is an optically active liquid crystalline compound of the formula

$$R^1{+}C{\overline{)_l}}A{+}C{\overline{)_m}}R^2 \atop \|\phantom{xxx}\| \atop O\phantom{xxx}O \qquad (I)$$

wherein l and m each are 0 or 1; at least one of $R^1$ and $R^2$ is an optically active alkoxy group of the formula $$\begin{array}{c} R^3 \\ | \\ -OCH-R^4 \\ * \end{array}$$

wherein $R^3$ is 2 or 3C alkyl and $R^4$ is 3–18C alkyl, but $R^3 \neq R^4$ and the other thereof is 1–20C alkyl, alkoxy or alkanoyloxy, halogen or cyano; and A is a specified two or three rings compound.

11 Claims, 2 Drawing Sheets

OPTICALLY ACTIVE LIQUID CRYSTALLINE COMPOUND AND A COMPOSITION CONTAINING SAME

This is a continuation of application Ser. No. 07/468,009, filed Jan. 22, 1990, now abandoned which in turn is a continuation of application Ser. No. 240,192 filed Sep. 6, 1988 now abandoned and the benefits of 35 USC 120 are claimed relative to it.

BACKGROUND OF THE INVENTION

1. Field of the Invention

This invention relates to a novel liquid crystalline compound and a liquid crystal composition containing the same. More particularly it realtes to a liquid crystalline compound having an optically active group and a liquid crystal composition containing the same.

The liquid crystalline compound referred to herein includes not only those which can be observed to exhibit liquid crystal state by themselves, but also those which cannot be observed to exhibit liquid crystal state by themselves, but have a chemical structure similar to those of liquid crystal compounds and also have properties useful as a component for liquid crystal compositions.

2. Description of the Related Art

At present, TN (Twisted Nematic) display mode has been most broadly employed, but it is inferior in the aspect of response rate to emissive mode display elements such as electroluminescence display, plasma display, etc., and in this respect, various improvements have been attempted, but it does not appear that possibility of a notable improvement remains so much.

Thus, various attempts at liquid crystal display devices base on another principle in place of that of TN mode display element have been made, and as one of the attempts, there is a display mode utilizing ferroelectric liquid crystals (N. A. Clark et al; Applied Phys. lett., 36, 899 (1980)). This mode utilizes ferroelectric liquid crystal chiral smectic C phase (hereinafter abbreviated to SC* phase) or chiral smectic H phase (hereinafter abbreviated to SH* phase), and has the following three superior specific features as compared with TN display mode:

A first specific feature is that the mode has a very high response rate which amounts to 100 times those of TN display element. A second specific feature is that the mode has a memory effect, and the multiplex drive becomes easy coupled with the above-mentioned high-speed response properties. A third specific feature is that gray scale can be more easily obtained than TN display mode only by adjusting the inversion time of polarity; hence the mode has been considered as suitable for graphic display.

However, in spite of such superior specific features, currently known ferroelectric liquid crystals and compositions have not yet afforded fully satisfactory results in the aspect of response rate; thus it seems that they have come to deadlock in advance of practical utilization thereof. The reason may be said to consist in that development of compounds having a large spontaneous polarization value Ps has been late.

SUMMARY OF THE INVENTION

The present inventors have made extensive research in order to develop an optically active liquid crystalline compound suitable to be utilized for the above-mentioned display mode, and as a result have found that by introducing an optically active 1-ethylalkyl group or an optically active 1-propylalkyl group into a compound, the resulting compound has a notably increased spontaneous polarization value.

Namely the object of the present invention is to provide a liquid crystal compound having specific features suitable to use for the above display mode, particularly a large spontaneous polarization value Ps, a liquid crystal composition using the above liquid crystal compound and an electrooptical element using the above composition.

The present invention resides in an optically active liquid crystalline compound expressed by the formula wherein l and m each represent 0 or 1; at least one of $R^3$ and $R^2$ represents an optically active alkoxy group expressed by the formula wherein $R^3$ represents an alkyl group of 2 or 3 carbon atoms and $R^4$ represents an alkyl group of 3 to 18 carbon atoms, but $R^3 \neq R^4$ and the other thereof represents an alkyl group, an alkoxy group or an alkanoyloxy group each of 1 to 20 carbon atoms, a halogen atom or cyano group; and A represents wherein X, Y and Z each independently represent any one of hydrogen atom, a halogen atom or cyano group;

a liquid crystal composition comprising at least two components at least one of which is the above compound; and an electrooptical element constituted by using the above liquid crystal composition.

DETAILED DESCRIPTION OF PREFERRED EMBODIMENTS

Figure 1:
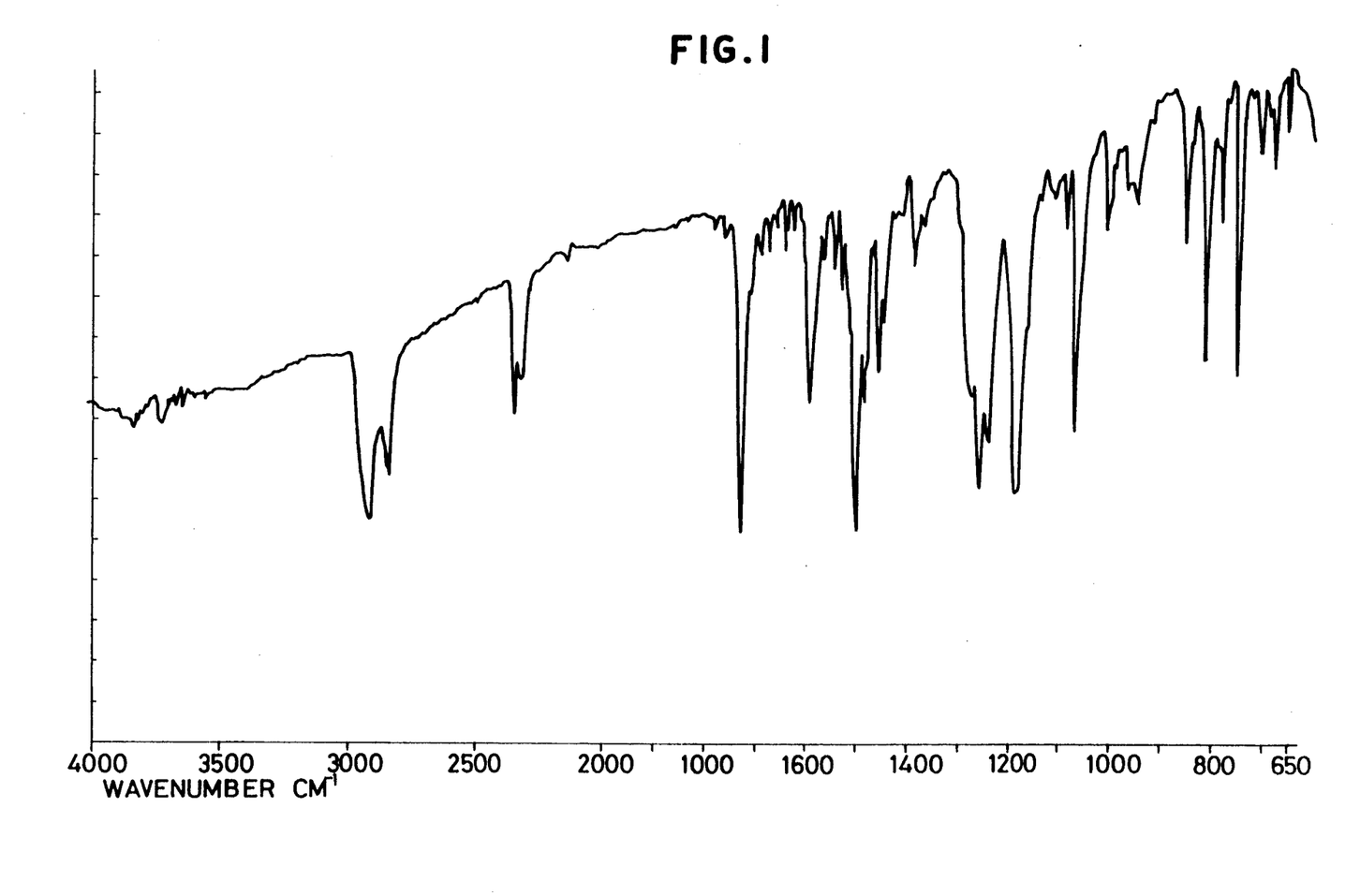
FIG. 1 shows an infrared absorption chart of a compound obtained in Example 2.
Figure 2:
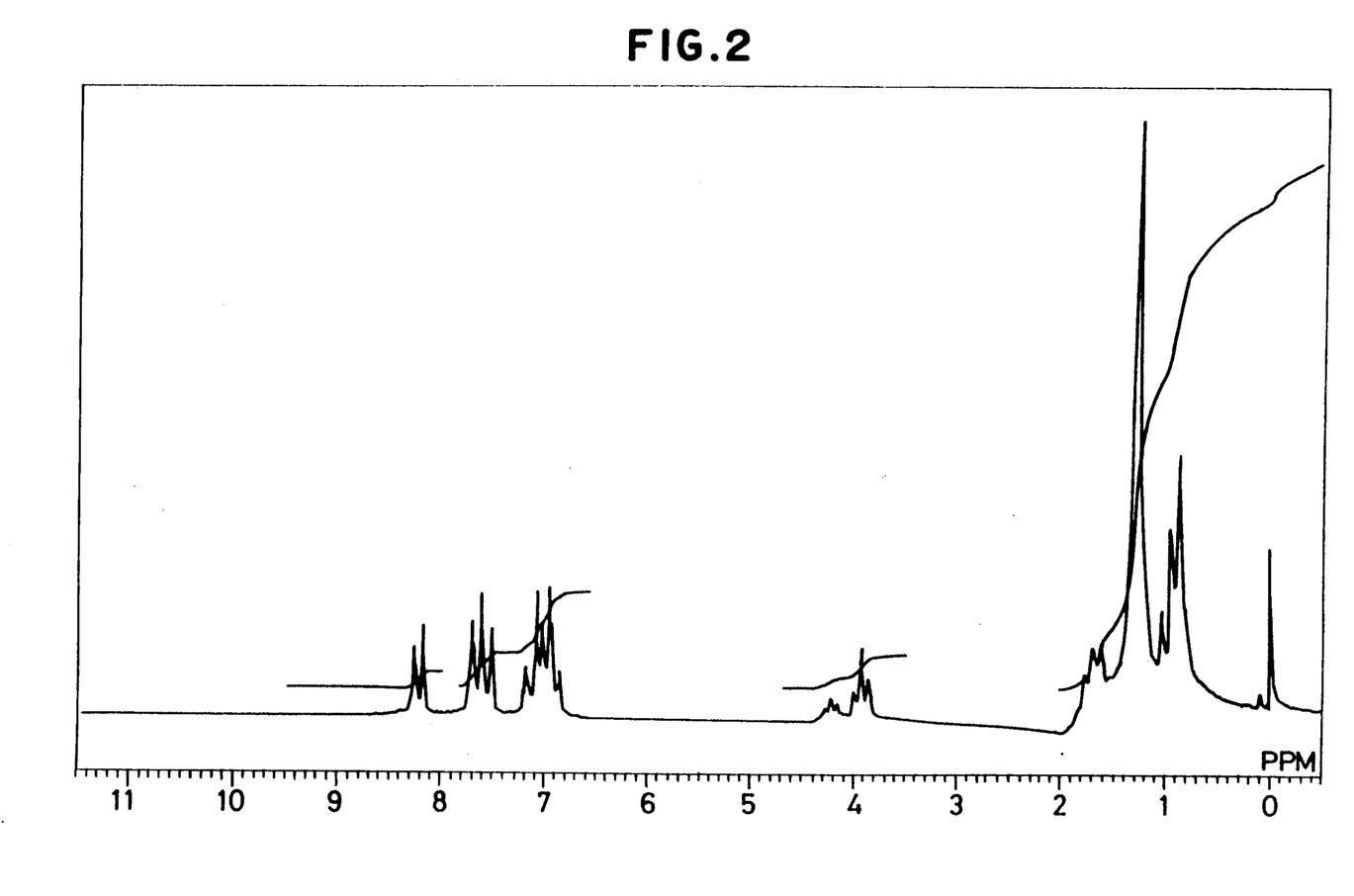
FIG. 2 shows an NMR measurement chart of the compound.

The compound of the formula (I) of the present invention may be prepared using an optically active 3-alkanol or an optically active 4-alkanol as a raw material therefor and according to a general method of organic synthesis, and for example the following compounds may be prepared:

-continued wherein R represents an alkyl group of 1 to 20 carbon atoms; X, Y and Z each independently represent any one of hydrogen atom, a halogen atom or cyano group; and R* represents an optically active group expressed by the formula wherein $R^3$ and $R^4$ are as defined above.

Any of the compound of the formula (I) exhibits no liquid crystal phase, but the compound has potentially a very high spontaneous polarizability. It has been known that a ferroelectric liquid crystal composition having a large spontaneous polarization value is higher in the response rate i.e. a rate at which molecules are inverted in an electric field than a ferroelectric liquid crystal composition having a small spontaneous polarization value, and as described later in Examples, a ferroelectric liquid crystal composition obtained by adding the compound of the formula (I) of the present invention in 10% by weight to a liquid crystal composition having a spontaneous polarization value of zero has a spontaneous polarization value of 6.1 $nC/cm^2$. This indicates that as calculated back from the above value, the spontaneous polarization value which the compound of the formula (I) has potentially is at least 61 $nC/cm^2$; hence it is seen that the compound of the formula (I) of the present invention has potentially a very large spontaneous polarization value. This is due to the fact that the asymmetric carbon atom in the optically active group is present at a site very close to that of the central core of the molecule to induce a large spontaneous polarization value due to the mutual action therebetween. For example, the following compound wherein the asymmetric carbon atom is present apart from the central core:

(Japanese patent application laid-open No. Sho 53-22883/1978) has a spontaneous polarization value as small as about 1 $nC/cm^2$ as measured by the present inventors; thus even in view of this fact it is seen that the compound of the formula (I) of the present invention has a superior characteristic. In short, it can be said that such a large spontaneous polarization value originates from an optically active 1-ethylalkyl group or an optically active 1-propylalkyl group and a compound having such an optically active group has a large spontaneous polarization value whatever the structure at another site is.

In addition, since the compound of the formula (I) has an optically active carbon atom, the compound has a capability of inducing a twisted structrue when added to a nematic liquid crystal. Nematic liquid crystals having a twisted structure i.e. chiral nematic liquid crystals do not form the so-called reverse domain of TN mode display element; hence the compound of the formula (I) may also be used as an agent for preventing the reverse domain from forming.

Further, a method has generally been employed wherein by adding a slight quantity of an optically active substance to a liquid crystal composition, the reverse twist of liquid crystal molecules is restrained to impart a right-handed or left-handed helical structure to the liquid crystal molecules and thereby retain a display quality, but the pitch of a chiral nematic liquid crystal composition having the compound of the present invention blended wherein was e.g. as short as 27.9 μm at 25° C. when the compound was added in 1 % by weight to a liquid crystal composition, ZLI-1132 (tradename of product made by Merck Company) and the resulting composition was measured, that is, a necessary pitch is easily obtained by adding a small quantity thereof; hence the compound can be said to be very useful as an agent for adjusting the pitch of chiral nematic liquid crystal compositions.

Further, its temperature characteristic is incomparably good and the temperature characteristic δP expressed by the equation $$\delta P = \frac{2\,(P(t_1) - P(t_2))}{P(t_1) + P(t_2)} \times \frac{100}{t_1 - t_2}$$

wherein P(t): pitch at t° C., t: temperature, was as very small as $-0.033$ ($t_1 = 20°$ C. and $t_2 = 70°$ C.). This indicates that there is no temperature dependency of the pitch, and there occurs no phenomenon that the pitch increases with the rise of temperature to have a bad effect upon alignment, etc. as in the case of generally known and practically used optical actove compounds.

This can be said to be a surprising characteristic in view of the fact that the δP of (S)-4'-cyano-4-(2-methylbutyl)biphenyl as one of currently known agents for adjusting the pitch of chiral nematic liquid crystal compositions is 0.584 under the same conditions.

The compound of the formula (I) of the present invention will be described in more detail by way of Examples.

EXAMPLE 1

Preparation of R-4'-(1-ethylheptyloxy)biphenyl-4-carboxylic acid 4-octyloxyphenyl ester (a compound of the formula (I) wherein $R^1 = OCHC_6H_{13}$, with $C_2H_5$ substituent, $R^2 = C_8H_{17}O-$, -continued $l = m = 0$)

First step

A solution of p-toluenesulfonic acid chloride (250 g, 1.4 mol) dissolved in toluene (400 ml) was dropwise added under ice cooling to a solution of S-(+)-3-nonal (180 g, 1.3 mol) dissolved in dry pyridine (800 ml), followed by agitating the mixture at 40° C. for 2 hours, adding toluene and water, sufficiently shaking the mixture, separating the organic layer, washing it with 6N-hydrochloric acid, then with 2N-NaOH aqueous solution and further with water, drying the resulting organic layer over anhydrous magnesium sulfate and distilling off toluene to obtain a colorless, oily S-p-toluenesulfonic acid 1-ethylheptyl ester (306 g).

Second Step

A mixture of 4'-hydroxybiphenyl-4-carboxylic acid ethyl ester (54.5 g, 0.23 mol), S-p-toluenesulfonic acid 1-ethylheptyl ester (82 g, 0.27 mol), ethanol (350 ml) and KOH (15 g, 0.27 mol) was refluxed for 4 hours, followed by adding toluene and water, sufficiently shaking the mixture, separating the organic layer, sufficiently washing the layer with 6N-hydrochloric acid, then with 2N—NaOH aqueous solution and further with water, drying the resulting organic layer over anhydrous magnesium sulfate, distilling off toluene to obtain a colorless, oily substance (83 g), adding to this substance, NaOH (92 g, 2.3 mol), water (300 ml) and ethanol (300 ml), refluxing the mixture for one hour, portion-wise adding 6N-hydrochloric acid to acidify the resulting material, collecting deposited crystals and recrystallizing from acetic acid to obtain R-4'-(1-ethyl-heptyloxy)biphenyl-4-carboxylic acid (43 g). M.P.: 144.4°–146.3° C.

Third step

R-4'-(1-ethylheptyloxy)biphenyl-4-carboxylic acid obtained at the second step was treated with thionyl chloride in a conventional manner to obtain R-4'-(1-ethylheptyloxy)biphenyl-4-carboxylic chloride (11 g, 0.03 mol), which was then added to a mixture of p-octyloxyphenol (8.2 g, 0.04 mol) with pyridine (100 ml), followed by agitating the resulting mixture at 55° C. for 2 hours, adding toluene and water, sufficiently shaking the mixture, separating the resulting organic layer, sufficiently washing it with 6N-hydrochloric acid, when with 2N—NaOH aqueous solution and further with water, drying the resulting organic layer over anhydrous magnesium sulfate, distilling off toluene and recrystallizing the residue from ethanol to obtain R-4'-(1-ethyl-heptyloxy)biphenyl-4-carboxylic acid 4-octyloxyphenyl ester (8.2 g). M.P.: 68.0° C.

Further, this product was added in 1% by weight to a nematic liquid crystal composition, ZLI-1132 (tradename of product made by Merck Company), and the pitch of the resulting chiral nematic liquid crystal composition was measured to give 29.6 μm at 25° C.

EXAMPLE 2

Preparation of R-4'-(1-ethylheptyloxy)biphenyl-4-carboxylic acid 4-decyloxyphenyl ester (a compound of the formula (I) wherein $R^1 = \text{OCHC}_6\text{H}_{13}$, $R^2 = C_{10}H_{21}O—$, $l = m = 0$)

Using p-decyloxyphenol in place of p-octyloxyphenol used at the third step of Example 1, R-4'-(1-ethylheptyloxy)biphenyl-4-carboxylic acid 4-decyloxyphenyl ester (m.p. 82.0° C) was obtained in the same manner.

Further, this product was added in 1% by weight to a nematic liquid crystal composition, ZLI-1132 (tradename of product made by Merck Company), and the pitch of the resulting chiral nematic liquid crystal composition was measured to give 27.9 μm at 25° C.

EXAMPLE 3

Preparation of R-4'-(1-ethylheptyloxy)biphenyl-4-carboxylic acid pentyl ester (a compound of the formula (I) wherein $R^1 = —\text{OCHC}_6\text{H}_{13}$, $R^2 = —OC_5H_{11}$, A = , $l = 0, m = 1$)

Using n-pentanol in place of p-octyloxyphenyl used at the third step of Example 1, R-4'-(1-ethylheptyloxy)-biphenyl-4-carboxylic acid pentyl ester in the form of an oily substance at room temperature was obtained in the same manner except that purification was carried out not by means of recrystallization, but by means of separation purification using chromatography.

Further, the product was added in 1% by weight to a chiral nematic liquid crystal composition, ZLI-1132 (tradename of product made by Merck Company), and the pitch of the resulting chiral nematic liquid crystal composition was measured to give 30.0 μm at 25° C.

EXAMPLE 4

Preparation of R-4'-(1-ethylheptyloxy)benzoic acid 4-pentylphenyl ester (a compound of the formula (I) wherein $R^1 = —\text{OCHC}_6\text{H}_{13}$, $R^2 = -C_5H_{11}$, A = l = m = 0)

First step

A mixture of p-hydroxybenzoic acid methyl ester (61 g, 0.4 mol), KOH (22g, 0.4 mol), ethanol (400 ml) and S-p-toluenesulfonic acid 1-ethylheptyl ester (100 g, 0.34 mol) prepared in Example 1 was refluxed for 4 hours, followed by adding toluene and water, sufficiently shaking the mixture, separating the organic layer, sufficiently washing it with 6N-hydrochloric acid, then with 2N-NaOH aqueous solution and further with water, drying the resulting organic layer over anhydrous magnesium sulfate, distilling off toluene, adding NaOH (80 g, 2 mols), water (300 ml) and ethanol (100 ml), refluxing the mixture for one hour, portion-wise adding 6N-hydrochloric acid to acidify the resulting material, adding ether for extraction, drying the extract over anhydrous magnesium sulfate and distilling off ether to obtain R-4-(1-ethyl-heptyloxy)benzoic acid (33 g).

Second step

Using R-4-(1-ethylheptanoxy)benzoic acid (11 g, 0.04 mol) and p-pentylphenol (13.7 g, 0.08 mol), R-4-(1-ethylheptyloxy)benzoic acid 4-pentylphenyl ester (14 g) was obtained in the same manner as in Example 1 (third step). This product was an oily substance at room temperature.

Further, this product was added in 1% by weight to a nematic liquid crystal composition, ZLI-1132 (tradename of product made by Merck Company), and the pitch of the resulting chiral nematic liquid crystal composition was measured to give 32.2 μm at 25° C.

EXAMPLE 5

Preparation of S-4'-pentyloxybiphenyl-4-carboxylic acid 1-ethylheptyl ester (a compound of the formula (I) wherein $R^1 = -\overset{C_2H_5}{\underset{*}{O{C}HC_6H_{13}}}$, $R^2 = -OC_5H_{11}$, A = l = 1   m = 0)

A mixture of 4'-pentyloxybiphenyl-4-carboxylic acid chloride (9.5 g, 0.032 mol), S-(+)-3-nonal (5 g, 0.035 mol) and pyridine (100 ml) was agitated at about 55° C. for 2 hours, followed by adding toluene and water, sufficiently shaking the resulting mixture, separating the resulting organic layer, washing it with 6N-hydrochloric acid, then with 2N—NaOH aqueous solution and further with water, drying the organic layer over anhydrous magnesium sulfate, distilling off toluene and recrystallizing the residue from ethanol to obtain S-4'-pentyloxybiphenyl-4-carboxylic acid 1-ethylheptyl ester (8.1 g). M.P.: 25.8° C.

Further, this product was added in 1% by weight to a nematic liquid crystal composition, ZLI-1132 made by Merck Company and the pitch of the resulting chiral nematic liquid crystal composition was measured to give 11.0 μm at 25° C.

EXAMPLE 6

Preparation of S-4'-pentyloxybiphenyl-4-carboxylic acid 1-propylheptyl ester (a compound of the formula (I) wherein $R^1 = -\overset{C_3H_7}{\underset{*}{O{C}HC_6H_{13}}}$, $R^2 = -OC_5H_{11}$, A = l = 1   m = 0)

Example 5 was repeated except that S-(+)-3-nonal used in Example 5 was repalced by S-(+)-4-decanol ($[\alpha]_D^{23.8} = +0.63$ (neat)) prepared in the same manner as in the process of Japanese patent application No. Sho 61-8997/1986 (Yoshida et al), to obtain S-4'-pentyloxybiphenyl-4-carboxylic acid 1-propylheptyl ester ($[\alpha]_D^{23.0} = +4.0$ (C=1.50, CH Cl$_3$). This product was an oily substance at room temperature.

Further, this product was added in 1% by weight to a nematic liquid crystal composition, ZLI-1132 made by Merck Company and the pitch of the resulting chiral nematic liquid crystal composition was measured to give 36.1 μm at 25° C.

EXAMPLE 7

Preparation of R-4'-decyloxy-4-(1-ethylheptyloxy)biphenyl (a compound of the formula (I) wherein $R^1 = -\overset{C_2H_5}{\underset{*}{O{C}HC_6H_{13}}}$, $R^2 = -OC_{10}H_{21}$, A = l = m = 0)

A mixture of 4'-decyloxy-4-hydroxybiphenyl (6 g, 0.02 mol), KOH (1.0 g, 0.02 mol), ethanol (160 ml) and S-p-toluenesulfonic acid-1-ethylheptyl ester (5.6 g, 0.02 mol) prepared in Example 1 was refluxed for 4 hours, followed by adding toluene and water, sufficiently shaking the mixture, separating the organic layer, sufficiently washing it with 6N-hydrochloric acid, then with 2N-NaOH aqueous solution and further with water, drying the resulting organic layer over anhydrous magnesium sulfate, distilling off toluene and recrystallizing the residue from ethanol to obtain R-4'-decyloxy-4-(1-ethylheptyloxy)biphenyl (7.1 g). M.P. 19.2° C.

Further, this product was added in 1% by weight to a nematic liquid crystal composition, ZLI-1132 made by Merck Company, and the pitch of the resulting chiral nematic liquid crystal composition was measured to give 26.4 μm at 25° C.

EXAMPLE 8

Preparation of
R-4'-cyano-4-(1-ethylheptyloxy)biphenyl (a compound of the formula (I) wherein $R^1 = -\text{O}\overset{*}{\text{C}}\text{HC}_6\text{H}_{13}$,
        |
        $\text{C}_2\text{H}_5$ $R^2 = -\text{CN}$, A = , l = m = 0)

Example 7 was repeated except that 4'-decyloxy-4-hydroxybiphenyl used in Example 7 was replaced by 4'-cyano-4-hydroxybiphenyl, to obtain R-4'-cyano-4-(1-ethylheptyloxy)biphenyl. This product was an oily substance at room temperature.

Further, this product was added in 1% by weight to a nematic liquid crystal composition, ZLI-1132 made by Merck Company and the pitch of the resulting chiral nematic liquid crystal composition was measured to give 23.3 μm at 25° C.

EXAMPLE 9

Preparation of R,R-4,4'-di-(1-ethylheptyloxy)biphenyl (a compound of the formula wherein $R^1, R^2 = -\text{O}\overset{*}{\text{C}}\text{HC}_6\text{H}_{13}$,
        |
        $\text{C}_2\text{H}_5$

A = , l = m = 0)

Example 7 was repeated except that 4'-decyloxy-4-hydroxybiphenyl used in Example 7 was replaced by 4,4'-biphenol, to obtain R,R-4,4'-(1-ethylheptyloxy)-biphenyl. This product was an oily substance at room temperature.

Further, this product was added in 1% by weight to a nematic liquid crystal composition, ZLI-1132 made by Merck Company and the pitch of the resulting chiral nematic liquid crystal composition was measured to give 16.1 μm at 25° C.

EXAMPLE 10 (USE EXAMPLE 1)

A liquid crystal composition consisting of the following compounds was prepared:

The spontaneous polarization value of the above composition was 0 nC/cm² and the phase transition points were as follows:

Iso-S$_A$ point 58.0° C., S$_A$-Sc point 53.0° C.

To the above composition (90% by weight) was added the compound of Example 5 (10% by weight)

to prepare a chiral smectic liquid crystal composition.

The phase transition points of this composition were as follows:

Iso-S$_A$ point 50.0° C., S$_A$-Sc* point 39.8° C.

Further, the spontaneous polarization value was measured to give 6.1 nC/cm² at 25° C.

EXAMPLE 11 (USE EXAMPLE 2)

A nematic liquid crystal composition consisting of was filled in a cell having a distance between electrodes of 10 μm to prepare a TN mode display cell, which was then observed under a polarizing microscope. As a result, a reverse twist domain was observed to be formed. In addition, the cell used was obtained by applying polyvinyl alcohol as an aligning agent, followed by rubbing the resulting surface to subject it to a parallel aligning treatment.

To the above nematic liquid crystal composition was added the compound of Example 6 in 0.1% by weight, followed by observing the resulting composition with the same TN mode cell. As a result, the reverse twist domain was dissolved and a uniform nematic phase was observed.

EXAMPLE 12 (USE EXAMPLE 3)

The compound of Example 2 was added in 1% by weight to a nematic liquid crystal composition (ZLI-1132, tradename of product made by Merck Company) to prepare a chiral nematic liquid crystal composition.

This chiral nematic liquid crystal composition was filled in a cell having a distance between electrodes of 10 μm to observe the temperature change in the helical pitch. The results are shown in the following Table:

| Temperature (°C.) | Pitch length (μm) | δ P$_{20\sim T}$ |
|---|---|---|
| 20 | 28.0 | — |
| 30 | 27.8 | −0.066 |
| 40 | 27.8 | −0.033 |
| 50 | 28.8 | 0.0 |
| 60 | 28.0 | 0.0 |
| 70 | 27.6 | −0.033 |

As described above, it was found that the temperature dependency of the helical pitch was very small and the compound had superior characteristics as an agent for adjusting the pitch of chiral nematic liquid crystal compositions.

What we claim is:

1. An optically active liquid crystalline compound expressed by the formula wherein 1 represents 0 or 1; R$_1$ represents an optically active group expressed by the formula wherein R$_3$ represents an alkyl group of 2 or 3 carbon atoms and R$_4$ represents an alkyl group of 3 to 18 carbon atoms, but R$_3 \neq$R$_4$ and R$_2$ represents an n-alkyl group, an n-alkoxy group or an n-alkoxycarbonyl group each of 1 to 20 carbon atoms, a halogen atom, cyano group; or an optically active group expressed by the formula wherein R$_3$ and R$_4$ are as defined above; and A represents

2. A liquid crystal composition comprising at least two components at least one of which is an optically active liquid crystalline compound expressed by the formula wherein 1 represents 0 or 1; R$_1$ represents an optically active group expressed by the formula wherein R$_3$ represents an alkyl group of 2 or 3 carbon atoms and R$_4$ represents an alkyl group of 3 to 18 carbon atoms, but R$_3 \neq$R$_4$ and R$_2$ represents an n-alkyl group, an n-alkoxy group of an n-alkoxycarbonyl group each of 1 to 20 carbon atoms, a halogen atom, cyano group; or an optically active group expressed by the formula wherein R$_3$ and R$_4$ are as defined above, and A represents

3. An optically active compound expressed by the formula

4. An optically active compound expressed by the formula

5. An optically active compound expressed by the formula

6. An optically active compound expressed by the formula

7. An optically active compound expressed by the formula

8. An optically active compound expressed by the formula

9. An optically active compound expressed by the formula

10. An optically active compound expressed by the formula

11. An optically active compound expressed by the formula

* * * * *